Figure 1:
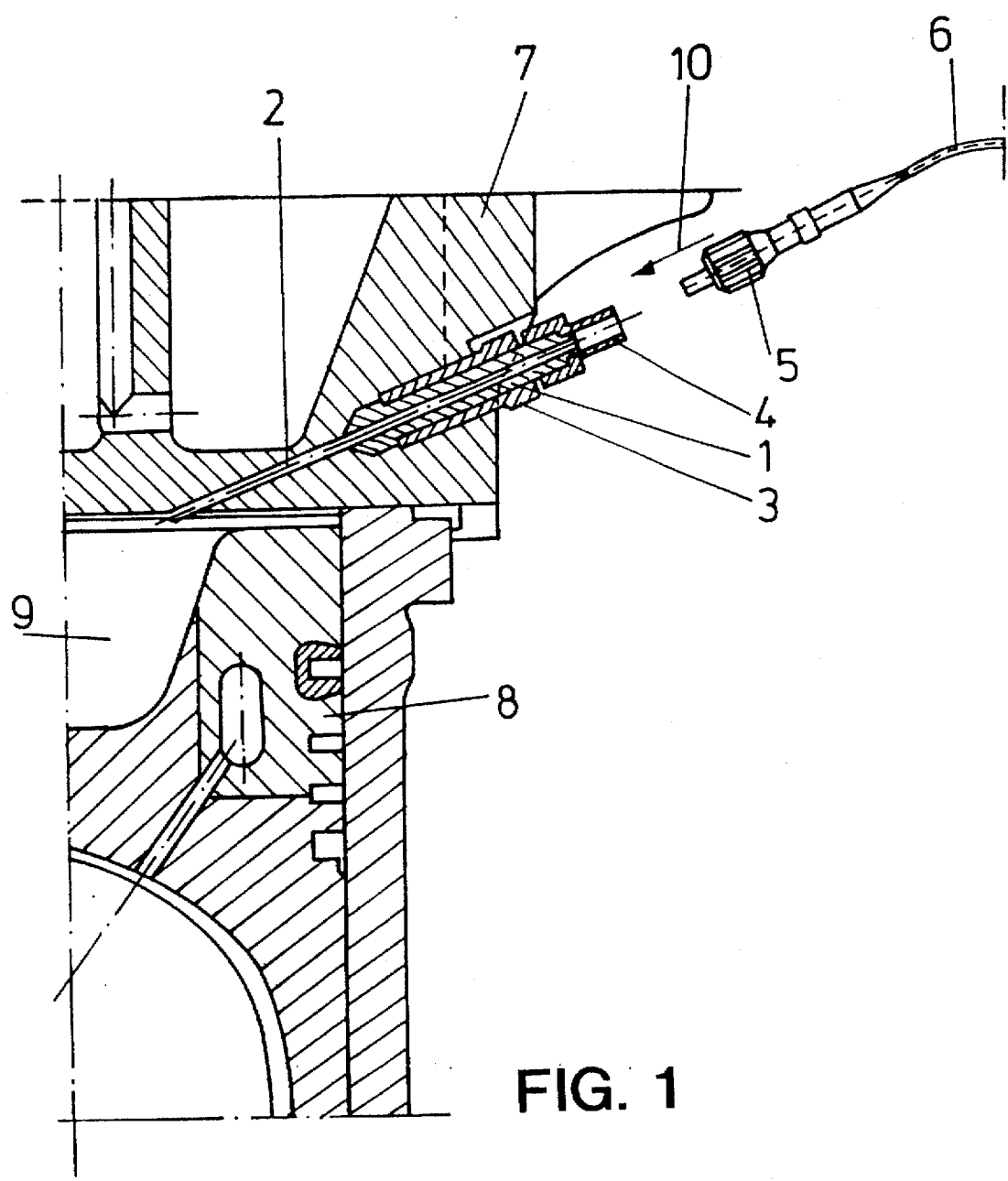

United States Patent [19]
Pockstaller et al.

[11] Patent Number: 5,762,045
[45] Date of Patent: Jun. 9, 1998

[54] METHOD OF AND APPARATUS FOR ASCERTAINING A KNOCK INTENSITY SIGNAL OF AN INTERNAL COMBUSTION ENGINE

[75] Inventors: Franz Pockstaller; Christian Lang, both of Jenbach, Austria

[73] Assignee: Jenbacher Energiesysteme Aktiengesellschaft, Jenbach, Austria

[21] Appl. No.: 701,858

[22] Filed: Aug. 23, 1996

[30] Foreign Application Priority Data

Aug. 24, 1995 [AT] Austria ................................. 1424/95

[51] Int. Cl.$^6$ .......................... G01L 23/22; F02P 5/15; F02D 43/04
[52] U.S. Cl. ........................ 123/425; 73/35.04; 123/435
[58] Field of Search ............................ 123/425, 435; 73/35.04, 35.06, 35.07

[56] References Cited

U.S. PATENT DOCUMENTS

| | | | |
|---|---|---|---|
| 4,381,748 | 5/1983 | Eckert et al. | 123/414 |
| 4,437,334 | 3/1984 | Laurenz | 73/35.07 |
| 4,444,043 | 4/1984 | Hattori et al. | 73/35.07 |
| 4,716,874 | 1/1988 | Hilliard et al. | 123/425 |
| 4,919,099 | 4/1990 | Extance et al. | 123/425 |
| 4,976,241 | 12/1990 | Ishida et al. | 123/425 |
| 5,052,214 | 10/1991 | Dils | 73/35.04 |
| 5,483,936 | 1/1996 | Kertstein et al. | 123/425 |
| 5,505,177 | 4/1996 | Herdin et al. | 123/435 |
| 5,531,201 | 7/1996 | Boverie et al. | 123/425 |

FOREIGN PATENT DOCUMENTS

| | | |
|---|---|---|
| 0392650 | 10/1990 | European Pat. Off. . |
| 0409166 | 1/1991 | European Pat. Off. . |
| 2918420 | 11/1980 | Germany . |

*Primary Examiner*—Tony M. Argenbright
*Attorney, Agent, or Firm*—Lorusso & Loud

[57] ABSTRACT

A method of and an apparatus for ascertaining a knock intensity signal of an internal combustion engine, wherein an electrical light signal corresponding to the light emission in the combustion chamber is obtained by way of an optical sensor which extends into the combustion chamber, and by way of a photodetector, and then evaluated, wherein firstly the first derivative of the electrical light signal in respect of time is formed and a knock intensity signal is obtained therefrom.

21 Claims, 5 Drawing Sheets

METHOD OF AND APPARATUS FOR ASCERTAINING A KNOCK INTENSITY SIGNAL OF AN INTERNAL COMBUSTION ENGINE

The invention concerns a method of and an apparatus for ascertaining a knock intensity signal of an internal combustion engine, wherein an electrical light signal corresponding to the light emission in the combustion chamber is obtained by way of an optical sensor extending into the combustion chamber and by way of a photodetector, and then evaluated, wherein the height of the maximum of the first derivative of the light signal is obtained in a predefined angular mark window.

In order to detect the operating state of an internal combustion engine, it is already known to provide an optical sensor which extends into the combustion chamber and by means of which it is possible to detect the light emission which occurs upon combustion in the combustion chamber. A photodetector then converts the light detected by the optical sensor into a corresponding electrical light signal which is then evaluated.

Hitherto the problem frequently occurred that the optical sensor suffered from fouling in the course of time and that therefore resulted in falsification of the measurement results.

The object of the present invention is therefore that of providing a method and an apparatus of the general kind set forth in the opening part of this specification, with which an informative knock Intensity signal can be ascertained even over prolonged operating periods.

In accordance with the invention the method is characterized in that the knock intensity signal is formed from the position in respect of time and the height of the maximum of the first derivative of the light signal. Correspondingly the apparatus according to the invention is characterized in that the evaluation means includes a means for ascertaining the height and position of the maximum of the first derivative, form ed in the differentiating means, of the electrical light signal.

Differentiation of a light signal from the combustion chamber of an internal combustion engine is known per se. Thus for example in accordance with the proposal of DE-ES No 31 11 135 the differentiated signal is used to identify characteristic points such as the position of the commencement of combustion and the light maximum. In accordance with DE-OS No 34 10 067 the gradient is detected for extreme value counting and a correlation is made with a pattern configuration for ascertaining irregular combustion. DE-OS No 29 05 506 provides that the differentiated signal is used to detect the position of the commencement of combustion and combustion commencement regulation is based thereon. In comparison,r the subject of the invention provides that the differentiated light signal, that is to say the first derivative of the electrical light signal, is used to obtain a signal which gives the knock intensity of the internal combustion engine. By forming the first derivative and by evaluation thereof, it is possible to obtain an informative knock intensity signal substantially independently of probe fouling, over a prolonged period of time.

With the knock intensity signal for example the moment of ignition or the fuel-air ratio can advantageously be regulated by way of a regulating device, in order to provide for 'optical' knock regulation.

Figure 2:
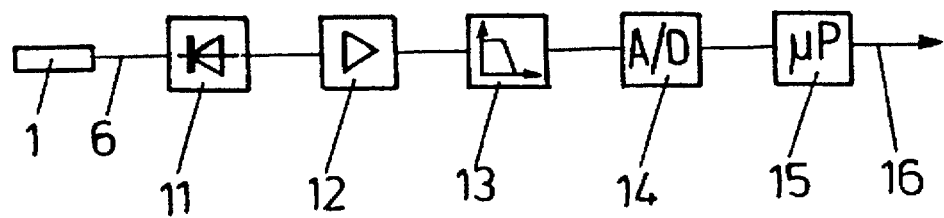
Figure 3:
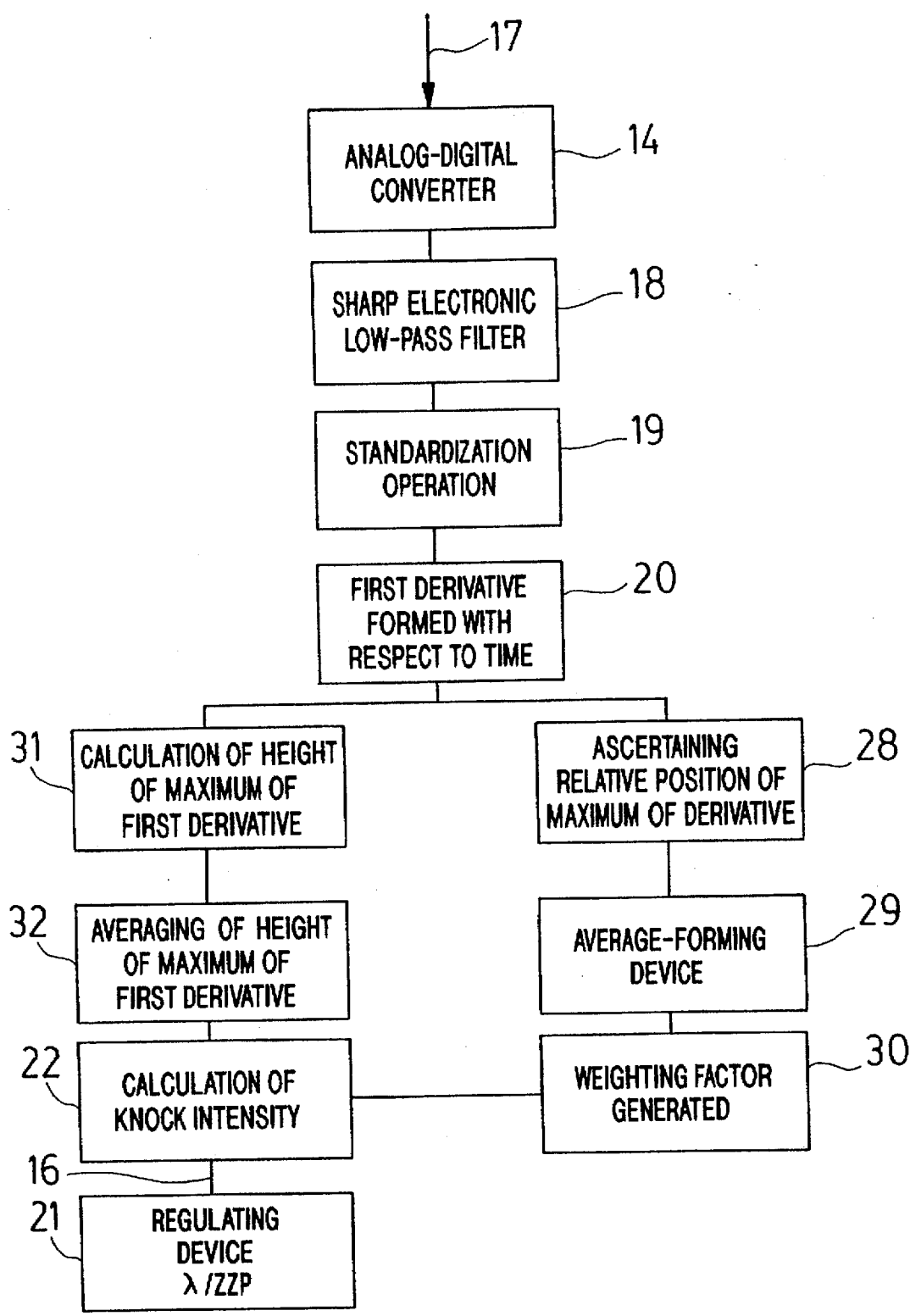
Figure 4:
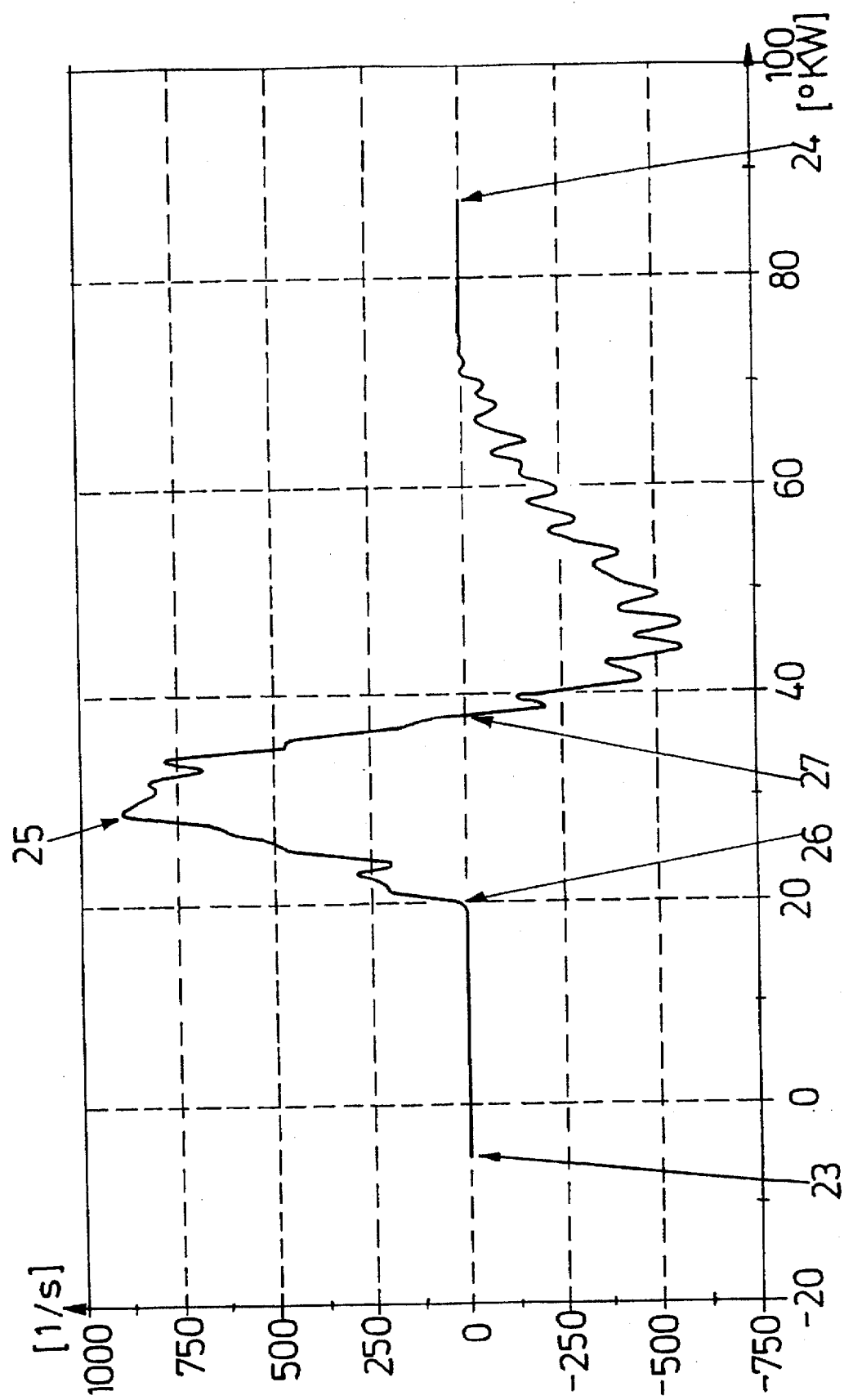
Figure 5:
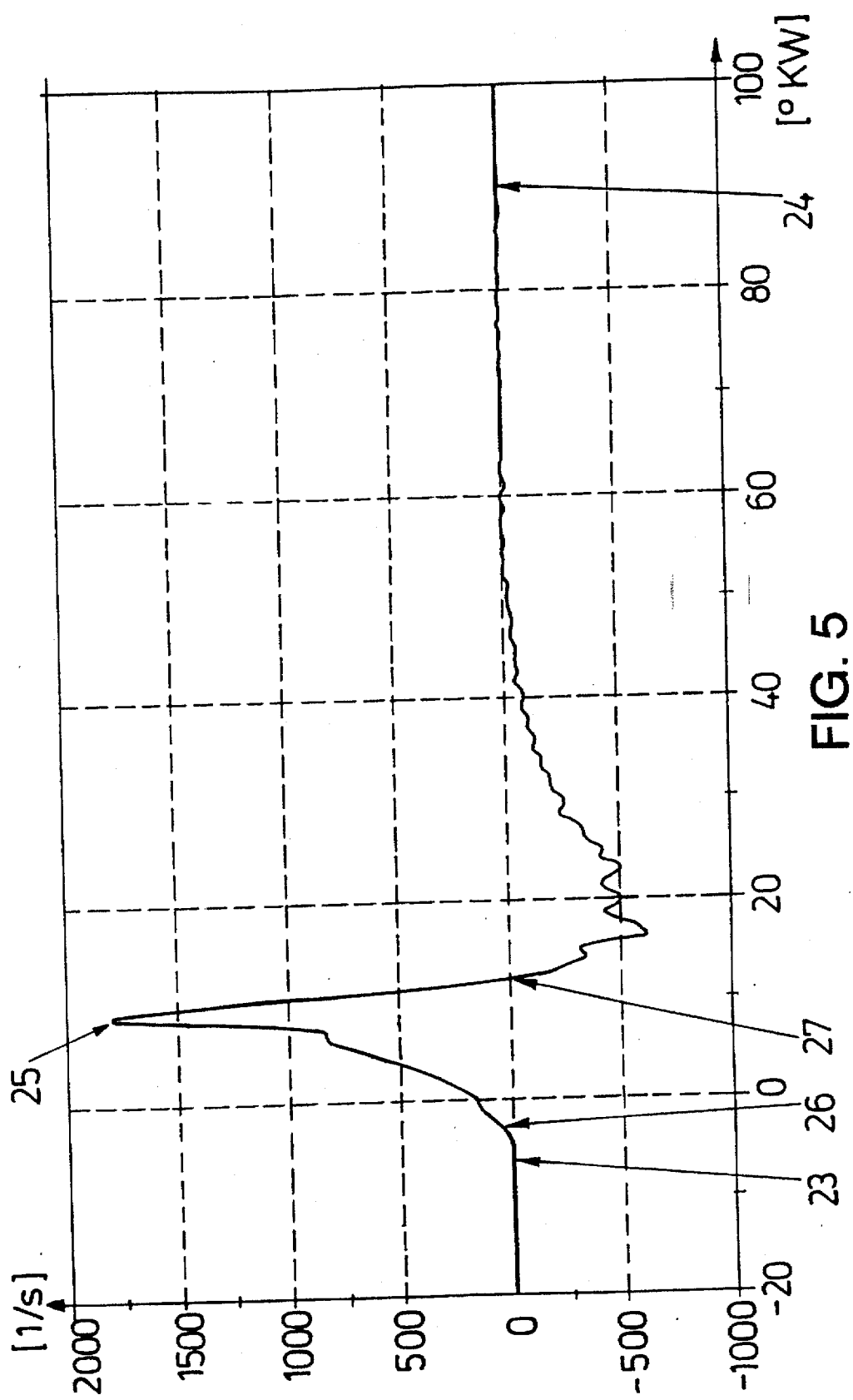
Figure 6:
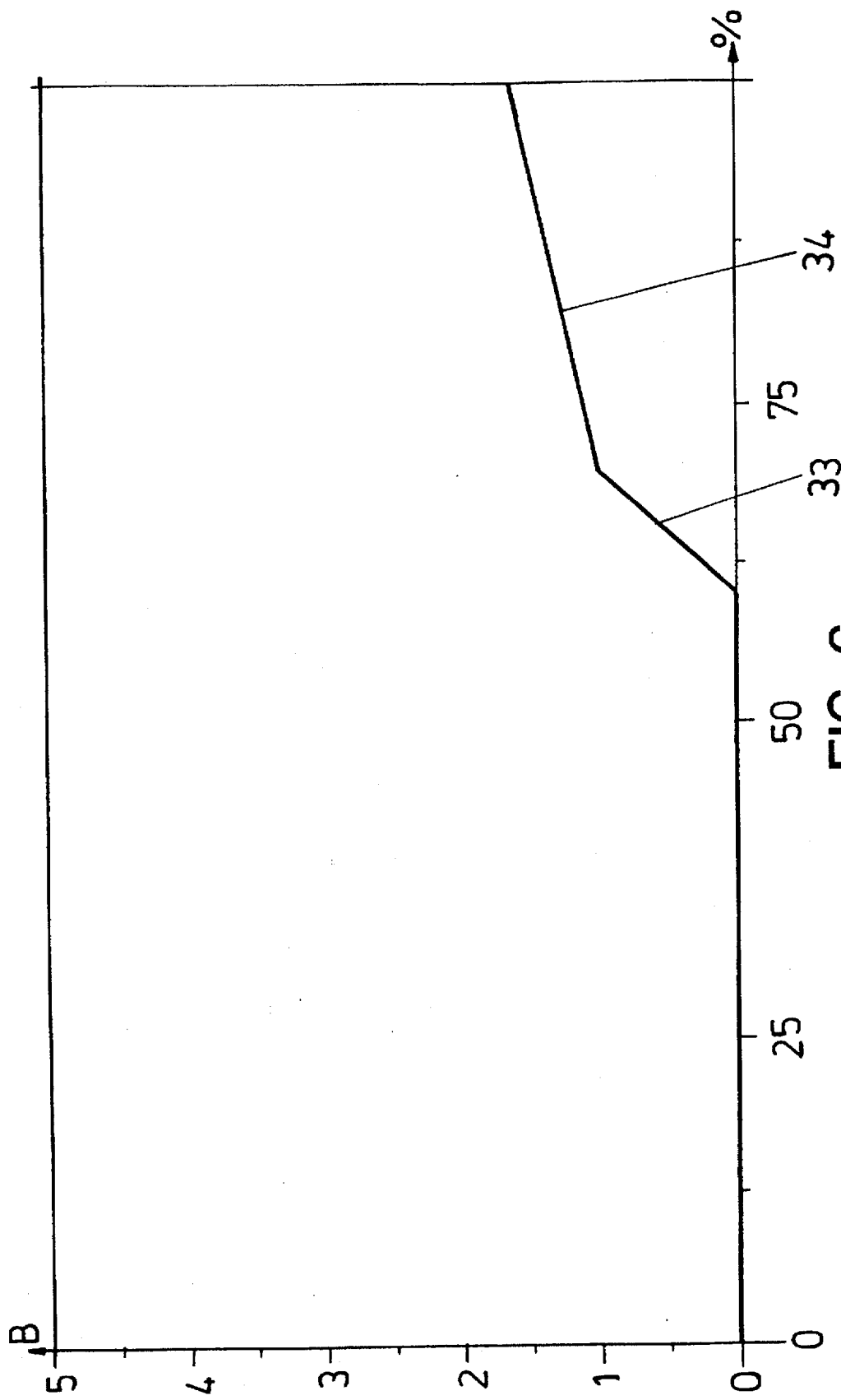

Further advantages and details of the invention are described in greater detail with reference to the following specific description. In the drawing:

FIG. 1 is a diagrammatic view in cross-section through the cylinder head region of a cylinder with inserted optical sensor, FIG. 2 shows a block circuit diagram of an embodiment of an apparatus according to the invention for ascertaining a knock intensity signal, FIG. 3 shows a flow chart of a preferred embodiment of the method according to the invention, FIG. 4 shows the configuration of the first derivative in the event of non-knocking combustion, FIG. 5 shows the configuration of the first derivative in the event of knocking combustion, and FIG. 6 shows a configuration of the weighting factor B in relation to the relative position, plotted in percentage, of the maximum of the first derivative of the electrical light signal.

The optical sensor (probe) generally identified by reference numeral 1 is fitted in the cylinder head 7 of a cylinder of an internal combustion engine and held in position by means of a union nut 3. The optical sensor 1 includes a light-conducting glass bar 2 which extends into the combustion chamber 9 above the piston 8. In addition the optical sensor includes a light wave guide plug adaptor 4 which makes it possible for a light wave guide, in particular in the form of a flexible optical fiber 6, to be releasably connected to the outer end of the glass bar 2 by way of a light wave guide plug 5. For that purpose the light wave guide plug 5 only has to be fitted Into the light wave guide plug adaptor 4 in the direction of the arrow 10. That makes it possible for light which is produced upon combustion in the combustion chamber 9 to be fed firstly by way of the class bar 2 and then by way of the flexible optical fiber 6 to an evaluation device. The flexible optical fiber 6 permits the electronic evaluation device to be set up at a remote location, and it can be easily replaced in the event of damage.

As shown in FIG. 2 the light detected by the probe 1 is passed by way of the optical fiber 6 to a photodetector 11 (for example a photodiode) which converts the light signal into an electrical light signal. That signal is then amplified in an amplifier 12 and passed by way of a lows pass filter 13 which for example has a limit frequency of 4 kHz (generally below half the sampling frequency of the A/D converter). The low pass filter 13 ensures that higher frequencies present in the electrical light signal do not result in sampling errors in the subsequent digitization of the electrical light signal in the analog-digital converter 14. Finally the digitized electrical light signal passes into a digital evaluation device 15 (for example a digital microprocessor) which in accordance with the invention, forming the first derivative of the electrical light signal, ascertains a knock intensity signal and outputs it on the output line 16, as will be described in greater detail hereinafter.

An embodiment of (digital) electronic signal processing of the electrical light signal is shown in FIG. 3. Firstly the amplified and low-passed analog electrical light signal is fed by way of the line 17 to an analog-digital converter 14 which within a predetermined angular mark window effects analog-digital conversion of the electrical light signal. In this respect the term angular mark window is used to denote a predetermined range of the crankshaft angle, within which combustion occurs. The electrical light signal which is now in digital form is now passed again by way of a sharp electronic low pass filter 18 and then standardized to 1 (or generally to a constant value). The standardization operation is effected in step 19, more specifically by the electrical light signal of an internal combustion cycle being completely read in and stored and thereupon ascertained to the height of the maximum. Finally formation of the standardized electrical light signal ifs effected by all current values being divided by the value of the maximum, whereby the maximum of the standardized light signal acquires the value 1 and all other values are between 0 and 1. That standardization operation contributes to being independent of probe fouling. Then, in the device 20, in accordance with the invention, the first derivative in respect of time is formed from the standardized electrical light signal. A knock intensity signal is now obtained from that first derivative in respect of time—as will also be described in greater detail hereinafter—and the knock intensity signal is outputted on the line 16 to a regulating device 21 which for example in dependence on the knock intensity signal as the actual value, selects the fuel-air ratio lambda or the moment of ignition.

For the purposes of obtaining the knock intensity signal the maximum of the first derivative of the light signal is evaluated in a predefined angular mark window. That involves processing both the position of the maximum, in respect of time or crankshaft angle, and also the height thereof. In that respect, the processing branch at the left in FIG. 3 involves evaluation of the height of the maximum and that on the right in FIG. 3 involves evaluation of the position thereof, while finally the knock intensity number is calculated jointly in step 22.

FIG. 4 plots the configuration of the first derivative of the standardized electrical light signal of non-knocking combustion in relation to the crankshaft angle. Reference 23 denotes the beginning and reference 24 denotes the end of the angular mark window in which signal evaluation is effected. The maximum 25 is then ascertained from the signal which is read in a memory, as well as the signal beginning 26 and the positive signal end 27. In that respect the signal beginning 26 is defined as the first time of exceeding a preferably adjustable low threshold value in respect of the first derivative. The positive signal end is defined as the first passage through zero of the first derivative after the signal maximum 25. The points 26 and 27 define the beginning and the end of a relative time or crankshaft angle scale with respect to which the position of the maximum 25 is fixed, wherein the signal beginning 26 is defined by 0% and the positive signal end is defined by 100%. In the embodiment shown in FIG. 4 the maximum 25 (relative position with respect to the points 26 and 27) is at about 50%. That operation of ascertaining the relative position in percent with respect to the signal beginning 26 and the positive signal end 27 is effected in step 28 in FIG. 3.

If now, the first derivative of the standardized electrical light signal of knocking combustion is compared to the normal combustion process in FIG. 4, it will be noted that on the one hand the height of the maximum is greater and on the other hand the relative position of the maximum with respect to the two points 26 and 27 is substantially closer to the positive signal end 27, that is to say at about 70 to 80% on the relative positional scale between the points 26 and 27. That increase in the maximum of the first derivative and its displacement into the vicinity of the point 27 when knocking combustion occurs can now be used to obtain a knock intensity signal therefrom. For that purpose, a weighting factor B is firstly generated from the relative position of the maximum 25 of the first derivative, more specifically in step 30 as shown in FIG. 3, after an averaging operation in the average-forming device 29. The averaging operation is effected over a plurality of (for example 30) combustion cycles. The weighting factor B is then ascertained for example in accordance with a pre-stored curve, as is shown in FIG. 6, more specifically in dependence on the average relative position of the maximum of the first derivative of the standardized light signal. That weighting factor is then multiplied in step 22 by the height of the maximum of the first derivative, which was ascertained in step 31 and averaged in step 32, in order to obtain the desired knock intensity number.

It will be seen from the configuration of the weighting factor illustrated in FIG. 6 that it is equal to zero up to about 60% of the relative position of the maximum between the two points 26 and 27, that is to say in this case also the knock intensity number is equal to zero, irrespective of how high the maximum is. It is only when the maximum of the first derivative moves closer to the positive signal end 27, and therefore the relative position in terms of percentage is over about 60%, that the weighting factor rises, more specifically firstly in a steeper linear transitional region 33 and then a shallower region 34. If the relative position of the maximum falls in the region of the curves 33 and 34 the weighting factor is different from zero and in dependence on the position (weighting factor) and the height of the maximum of the first derivative that gives a knock intensity number which is different from zero and which indicates knocking operation and in dependence on which it is possible to provide for regulation of engine parameters which have an influence on the knocking characteristic.

The invention is not restricted to the illustrated embodiment. For example it would also be possible to evaluate only the position or alternatively the height of the first derivative of the electrical light signal. More reliable quantitative knock detection is however possible if use is made of both the position and also the height of the maximum of the first derivative, for ascertaining the knock intensity number. Finally it should also be mentioned that with the present-day state of the art the steps or stages shown in FIGS. 2 and 3 can naturally be implemented in a computer primarily in software terms.

What is claimed is:

1. An apparatus for ascertaining a knock intensity signal in the combustion chamber of an internal combustion engine comprising an optical sensor which extends into the combustion chamber, a photodetector for converting the light sensed by the sensor into an electrical light signal, differentiating means for differentiating the electrical light signal in respect of time, and at least one low pass filter with a limit frequency of 5 kHz and below, said differentiating means including an evaluation means which includes a means for ascertaining the height and position of the maximum of the first derivative to ascertain the knock intensity.

2. The apparatus as set forth in claim 1, wherein said at least one low pass filter is upstream of an analog-digital converter.

3. The apparatus as set forth in claim 1, wherein said at least one low pass filter is downstream of an analog-digital converter.

4. The apparatus as set forth in claim 1, wherein the differentiating means is a digital computer unit.

5. The apparatus as set forth in claim 4, wherein the digital computer unit is a microprocessor.

6. The apparatus as set forth in claim 1 wherein the means for ascertaining the height and position of the maximum of the first derivative averages the height and position of the maximum of the first derivative of the electrical light signal over a plurality of combustion cycles.

7. A method for ascertaining the knock intensity in a combustion chamber of an internal combustion engine, comprising sensing light emissions in the combustion chamber converting the light emissions to an electrical light signal evaluating the electrical light signal by taking the first derivative of the electrical light signal and obtaining the height of the maximum of the first derivative of the electrical light signal with in a predefined window corresponding to the crankshaft angles during which combustion occurs measuring the relative position of the maximum of the first derivative between the signal beginning and the positive signal end of the first derivative signal plotted in relation to time or the crankshaft angle, wherein the signal beginning is defined as when an adjustable threshold value of the first derivative is first exceeded and wherein a positive signal end is defined as when the first derivative first equals zero after the signal maximum of the first derivative is passed, and calculating the knock intensity from the position in respect of time and the height of the maximum of the first derivative of the electrical light signal.

8. The method as set forth in claim 7 wherein the light emissions are sensed by an optical sensor and converted to an electrical signal by a photodetector.

9. The method as set forth in claim 7 including the step of defining a weighting factor by the relative position of the maximum of the first derivative between the positive signal beginning and positive signal end.

10. The method of claim 9 wherein a knock intensity signal is obtained by multiplying the weighting factor by the height of the maximum of the first derivative.

11. The method of claim 10 wherein the weighting factor is defined as equal to zero from the positive signal beginning to an adjustable relative positional threshold value for the maximum of the first derivative and is different from zero from said relative positional threshold value to the positive signal end.

12. The method as set forth in claim 11 wherein the positional threshold value is adjusted for the maximum of the first derivative between 40% and 90%, and the positive signal beginning of the first derivative signal is plotted in relation to time or crankshaft angle to equal 0% and the positive signal end to equal 100%.

13. The method as set forth in claim 11 including the step of increasing the weighting factor in value from the positional threshold value to the positive signal end as a function of the relative position between the positive signal beginning and positive signal end.

14. The method as set forth in claim 13 wherein the weighting factor is increased as a function of the relative position of the maximum of the first derivative and is linear.

15. The method as set forth in claim 13 wherein the weighting factor is increased as a function of the relative position of the maximum of the first derivative as linear segments.

16. The method as set forth in claim 7 wherein the electrical light signal is passed through a low pass filter whose limit frequency is at or below 5 kHz.

17. The method of claim 7 wherein the electrical light signal is standardized before the first derivative is calculated.

18. The method of claim 7 wherein the electrical light signal is standardized to a maximum value of 1 before the first derivative is calculated.

19. The method as set forth in claim 7 including the step of evaluating at least one of height and position of the maximum of the first derivative with an average value, by averaging over a plurality of combustion cycles for at least one of height and position of the maximum of the first derivative.

20. A method for ascertaining and regulating the knock intensity in a combustion chamber of an internal combustion engine, comprising sensing light emissions in the combustion chamber converting the light emissions to an electrical light signal evaluating the electrical light signal by taking the first derivative of the electrical light signal and obtaining the height of the maximum of the first derivative of the electrical light signal within a predefined window corresponding to the crankshaft angles during which combustion occurs measuring the relative position of the maximum of the first derivative between the signal beginning and the positive signal end of the first derivative signal plotted in relation to time or the crankshaft angle, wherein the signal beginning is defined as when an adjustable threshold value of the first derivative is first exceeded and wherein a positive signal end is defined as when the first derivative first equals zero after the signal maximum of the first derivative is passed calculating the knock intensity from the position in respect of time and the height of the maximum of the first derivative of the electrical light signal inputing knock intensity signal data into a regulating device, and regulating engine parameters to reduce the knock behavior of the engine including at least one of ignition timing and fuel-to-air ratio by way of said regulating device.

21. An apparatus for ascertaining a knock intensity signal in the combustion chamber of an internal combustion engine comprising an optical sensor which extends into the combustion chamber, a photodetector for converting the light sensed by the sensor into an electrical light signal, differentiating means for differentiating the electrical light signal in respect of time, said differentiating means including an evaluation means which includes a means for ascertaining the height and position of the maximum of the first derivative to ascertain the knock intensity.

* * * * *